Jan. 13, 1959 A. GOLD 2,868,000
SELF-REGISTERING OVERLOAD MECHANISM
Filed Sept. 30, 1955
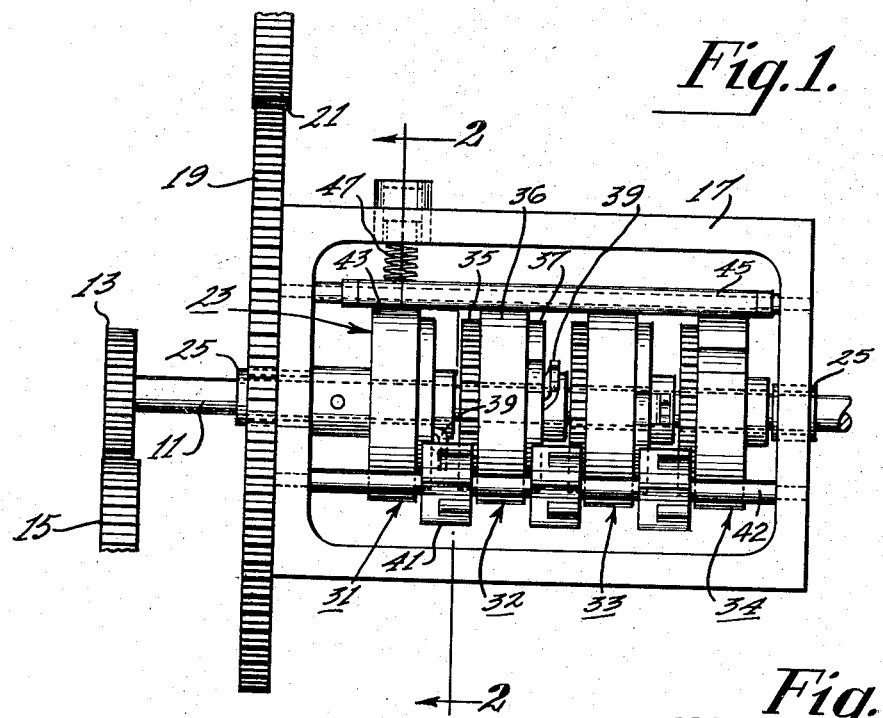
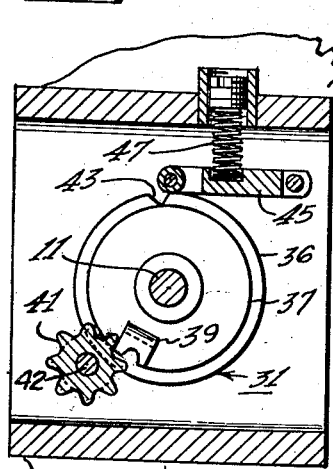
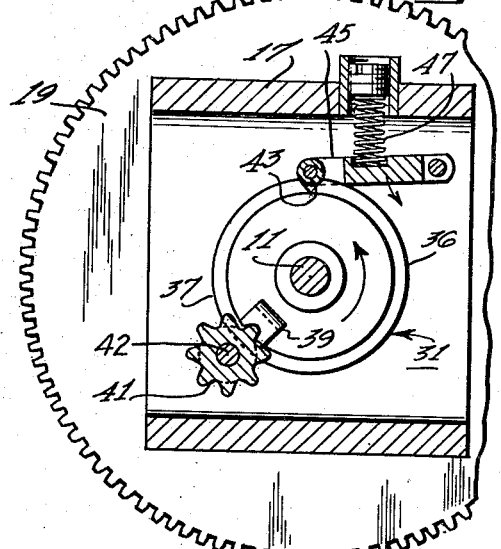
INVENTOR.
Archie Gold
BY
ATTORNEY.

United States Patent Office 2,868,000
Patented Jan. 13, 1959

2,868,000
SELF-REGISTERING OVERLOAD MECHANISM

Archie Gold, Philadelphia, Pa., assignor, by mesne assignments, to the United States of America as represented by the Secretary of the Air Force Application September 30, 1955, Serial No. 537,768

8 Claims. (Cl. 64—29)

This invention relates to an overload mechanism, and more particularly to an overload mechanism which measures the amount of overtravel of one rotating member with respect to another rotating member and which re-registers the rotating members when the overtravel has been taken up.

In certain types of mechanisms it is desirable to provide overload safety devices to protect relatively delicate components which may be mechanically linked with the mechanism. It is also desirable in certain types of mechanisms to provide means for converting an unlimited mechanical input angular displacement into a limited mechanical output angular displacement, or to provide for a limited mechanical output angular displacement which is to be driven by an unlimited mechanical input angular displacement. It is also desirable in certain types of mechanisms, such as analog computer mechanisms, to maintain index or registry of a rotational input member and a rotational output member, and at the same time to provide for overtravel of one member with respect to the other.

An object of this invention is to provide an improved overtravel mechanism which measures the amount of overtravel.

Another object of this invention is to provide an improved self-registering overload mechanism which permits overtravel of one rotational member with respect to another and which re-registers the members when the amount of overtravel is taken up.

A further object of this invention is to provide an improved overload mechanism which locks an input member and an output member at a registered position, which permits overtravel of one member with respect to the other member, and which prevents the members from again locking except at the original registered position.

A mechanism in accordance with the present invention includes rotational input and output members. A counting mechanism is connected between the input member and the output member. The counting mechanism is preferably associated with the output member and is driven by the input member to count the number of revolutions or measure the angular displacement of the input member with respect to the output member in either direction. The mechanism will effectively measure the angular separation of the members. A latch means is provided for normally locking the output member to the input member. When these members are locked together, the counting mechanism does not function. Means are provided for causing the latch mechanism to release when a predetermined overload condition exists between the input and output members. Release of the latch means causes the counting mechanism to be driven due to the differential rotation of the input and output members. The counting mechanism prevents the latch means from again locking the input and output members together until these members regain their original angular positions with respect to each other.

The novel features of the invention, as well as additional objects and advantages thereof, will be understood more fully from the following description when read in connection with the accompanying drawing, in which:

Figure 1 is a view in elevation of an overload mechanism embodying the present invention;

Figure 2 is a view in section, taken on the line 2—2 of Figure 1 looking in the direction of the appended arrows, which illustrates the mechanism when the input and output members are disengaged; and Figure 3 is a view in section similar to Figure 2 illustrating the mechanism when the input and output members are engaged or locked together.

Referring in more detail to the accompanying drawing, the mechanism comprises a central shaft 11 to which is rigidly fixed an input gear 13, for example. A housing 17 is mounted for rotation about the shaft 11 and has rigidly attached to it an output gear 19, for example. Mounted within the housing 17 about the shaft 11 is a revolution counter 23 for measuring the differential rotation or angular displacement of the shaft 11 with respect to the housing 17, or vice versa. The input and output gears 13 and 19 may each have the opposite function. The revolution counter 23 resembles a multistage revolution counter in which each stage is advanced one unit by each complete revolution of the preceding stage.

The entire mechanism is carried on the central shaft 11 which is supported in suitable bearings by a support member not shown. The input gear 13 meshes with a driving gear 15 which provides the input for the mechanism. The output gear 19 meshes with a driven gear 21 which is mechanically coupled to a mechanism or component to be driven. The housing 17 is mounted on the shaft 11 by means of suitable bearings 25 and is freely rotatable about the shaft. The housing is shown, in the accompanying drawing, in the form of a rectangular box having two opposing open sides, the housing bearings being mounted in the ends of the box. This configuration of the housing is shown illustratively and other housing configurations may serve equally well.

The revolution counter 23 comprises a series of four wheel units 31, 32, 33 and 34, mounted to be rotated progressively in the order indicated by the reference numerals. Each of the wheel units constitutes one member of a Geneva movement, each unit being made up of three elements. These elements include a full toothed gear 35, a notched wheel or cam 36, and a notched spacing disc 37. The spacing disc 37 is provided with a member 39 extending from the face of the disc. This extension 39 provides a notch in the periphery of the disc and further provides a pair of teeth adjacent the notch. The member 39 will be referred to as a toothed extension. The outer diameter of the gear 35, the diameter of the spacing disc 37 and the effective outer diameter of the toothed extension 39 are all identical.

The wheel unit 31 is fixed to the shaft 11 and is rotated by the shaft 11. The wheel units 32, 33 and 34 are mounted for rotation about the shaft 11. The wheel units are driven serially or progressively through three Geneva pinions 41 which are mounted for rotation about a shaft 42 fixed to the housing 17. One pinion is provided between each two adjacent wheel units. The Geneva pinions 41 comprise a full toothed portion having eight teeth, for example, and an intermittent toothed portion wherein alternate teeth are removed. The intermittent toothed portion is adapted to lock with the periphery of a notched spacing disc 37 to prevent rotation of the pinion 41 except at spaced intervals. The toothed extension 39 of one wheel unit engages the full toothed portion of the pinion 41 to drive the pinion 41 and a meshing full toothed gear 35 of a succeeding wheel unit.

The gear 35 is omitted from the first wheel unit 31 of the series since this unit is driven directly by the shaft 11. For each revolution of the first wheel unit 31, the toothed extension 39 of the spacing disc 37 associated with the wheel unit 31 engages the full toothed portion of the Geneva pinion 41 which is disposed between the wheel units 31 and 32. The notch in the spacing disc 37 receives one tooth of the intermittent portion of the Geneva pinion 41 permitting the pinion 41 to rotate. The pinion 41 is then rotated through an angle defined by two of its teeth and the wheel unit 32 is rotated through a corresponding angle. The wheel unit 32 may be rotated, for example, through one tenth of a revolution. For each revolution of one wheel unit, then, the next adjacent wheel unit is rotated one tenth of a revolution. The wheel unit 34, which is the last unit in this series, is not provided with a spacing disc 37 since this is not necessary. The illustrated revolution counter will count up to 999 revolutions. Since additional counter stages may be included, a mechanism for accepting any desired maximum number of revolutions may be provided.

The wheels 36 are each provided with notches 43 which are adapted to be engaged by a follower bar or latch 45. The latch 45 is pivotally mounted in the housing 17 about an axis which is parallel to the shaft 11. The latch is biased by means of a helical compression spring 47 to ride against the peripheries of the wheels 36. The portion of the latch 45 which is in actual engagement with the wheels 36 extends across the span of the wheel units so that it may only be received in the notches 43 when the notches of each of the wheel units 31 through 34 are aligned.

It is preferable that when the notches are aligned, each of the toothed extensions 39 be in engagement with its respective Geneva pinion 41 in the manner illustrated in Figure 3. With this arrangement, the entire counter assembly will be rotated an angular distance equivalent to one tooth when the wheel unit 31 is first rotated with respect to the housing 17. This means that all of the notches 43 are displaced an equivalent distance with respect to the latch. The wheel unit 31 then continues, independently, for one revolution. During the operation of the counting mechanism each of the wheels 36 must be rotated against the pressure of the latch 45. In order to raise the latch bar 45 from engagement with the peripheries of all of the wheels 36, the diameter of the wheel associated with the wheel unit 34 may be made slightly greater than the diameter of the other wheels 36. This means that the wheel unit 34 will support the latch 45 when it is disengaged from the notches 43 and permit free rotation of the remaining wheel units. With this arrangement, the counter mechanism will function in the same manner regardless of the direction of rotation of the shaft 11.

Figure 3 illustrates the mechanism when the latch 45 is engaged with the notches 43. This is the normal condition of the mechanism. In this condition, the driving gear 15 drives the shaft 11 through the input gear 13. The shaft 11 in turn drives the wheel unit 31, which is rigidly fixed to the shaft. The wheel unit 31, by means of the notch 43 in its associated wheel 36, drives the housing 17 through the latch 45. The output gear 19 is driven with the housing 17 and drives the driven gear 21. During normal operation, then, the entire mechanism rotates about the axis of the shaft 11.

Should the driven gear 21 be stopped, or its rotational speed retarded, with respect to the rotational speed of the driving gear 15, the wheel unit 31 will attempt to rotate with respect to the housing 17. The notch 43 of its associated wheel 36 will force the latch 45 out of the notch against the pressure of the biasing spring 47. If the wheel units are aligned as above described, all of the wheels will be rotated simultaneously and all will serve to force the latch member out of their respective notches. When this occurs, the driving gear 15 may continue to drive with respect to the driven gear 21 and the counting mechanism will count, within its limit, the number of revolutions of the shaft 11 with respect to the housing 17 or will measure the angular separation or displacement of the shaft 11 and the housing 17. The limit of the illustrated counting mechanism is 999 revolutions of the shaft 11 with respect to the housing 17, as indicated heretofore. When the relative rotation reaches one thousand revolutions, the notches 43 of the wheels 36 are again aligned in the normal condition, illustrated in Figure 3, in which the driving and driven gears 15 and 21 are again coupled together. In this condition, however, the shaft 11 and housing 17 are out of registration by one thousand revolutions.

If the amount of angular separation or overtravel of the shaft 11 with respect to the housing 17 is taken up in any manner before the mechanism limit is reached, by reversing the rotation of the shaft 11 for example, the same number of revolutions of the shaft 11 with respect to the housing 17 must be accomplished, before the notches 43 will again be aligned to again lock the driving gear and driven gear together. Hence, the mechanism permits the driving and driven gears to become disengaged, due to an overload or an intentional stoppage of the driven gear, and the mechanism will reestablish the relative angular positions of the driving and driven gears before they are again locked together, provided that the mechanism limit of 999 revolutions has not been exceeded.

It has been stated that the above mechanism will operate when the driven gear has been retarded or stopped with respect to the driving gear. It is apparent that the mechanism will operate similarly when the reverse situation takes place, that is, where the driving gear is stopped or retarded with respect to the driven gear. This assumes that the driven gear might be rotated after the driving gear has stopped, due to the moment or momentum of a load coupled to the driven gear, for example. Therefore, as indicated above, the gears 13 (input) and 19 (output) may have reverse functions, that is, the gear 19 may be the input gear and the gear 13 may be the output gear.

What is claimed is:

1. A self-registering overload mechanism comprising an input member and an output member, a mechanism connected between said members to measure the differential angular rotation of said members, latch means coupling said input member and said output member, said latch means being adapted to disengage in response to a predetermined differential load on said members, and said latch means being adapted to engage when said differential angular rotation of said members has been taken up.

2. A self-registering overload mechanism comprising an input member and an output member, latch means coupling said input member and said output member, said latch means being disengageable in response to a predetermined differential load placed on said members, a counting mechanism associated with said output member, means associated with said input member for driving said counting mechanism, said counting mechanism counting the number of revolutions of one of said members with respect to the other of said members, and said latch means being engageable when said revolutions of said one member with respect to said other member have been taken up.

3. A self-registering overload and overtravel mechanism comprising a rotational input member, an output member mounted on said input member and being rotatable with respect thereto, a counter mechanism associated with said output member, said input member driving said counter mechanism to count the revolutions of said input member with respect to said output member, means for locking said output member to said input member, means providing for the release of said locking means in response to a predetermined load on said output member, and means preventing said locking means from again locking said members until said members are returned to their original relative rotational positions with respect to each other.

4. A self-registering overload and overtravel mechanism comprising a rotational input member, an output member mounted on said input member and being rotatable with respect thereto, a counter mechanism associated with said output member, said input member driving said counter mechanism to measure the angular displacement of one of said members with respect to the other, means for locking said input and output members together, means providing for the release of said locking means in response to a predetermined differential load between said input and output members, and means preventing said locking means from again locking said input and output members together until said angular displacement has been taken up.

5. An overload mechanism for retaining register between rotational input and output members, said mechanism including a revolution counter connected between said input and output members, a locking member associated with said output member for preventing operation of said revolution counter, means for applying a predetermined force on said locking member to lock said revolution counter against rotation, means for driving said output member by said input member through said locking member, and said locking member being adapted to release said revolution counter when said predetermined force is overcome, said revolution counter counting the revolutions of said input member with respect to said output member whereby rotational register is retained.

6. A self-registering overtravel mechanism comprising an input shaft, a housing mounted for rotation with respect to said shaft, rotational output means associated with said housing, a revolution counter mounted within said housing, said counter comprising a series of wheels adapted to be actuated progressively, the first of said wheels being fixed to said shaft, said wheels each having a notch in its periphery, a latch pivotally mounted in said housing and dimensioned to engage all of said wheels, and means biasing said latch against the periphery of said wheels whereby said latch is urged into said notches when they are aligned, said output means being driven by said input shaft when said latch is engaged with said notches.

7. A self-registering overload mechanism for rotating members, said mechanism comprising an input shaft, an output member comprising a housing mounted for rotation on said shaft, a revolution counter comprising a series of progressively actuated cams mounted on said shaft, the first of said cams being fixed to said shaft, the remainder of said cams being actuated by intermittent gearing rotatably mounted in said housing, said cams each being provided with a peripheral notch, said notches being adapted to be aligned parallel to said shaft, a follower member pivotally mounted in said housing for engagement with all of said cams, said follower member being spring loaded to bear against said cams and to engage said cam notches when they are aligned to lock said housing and said shaft together, said follower member having means disengageable from said notches when said notches are misaligned, said cams becoming misaligned when the rotational velocity of said housing is changed with respect to the rotational velocity of said shaft whereby a relative angular displacement occurs between said output housing and said input shaft, said counter measuring said displacement, and said cam notches being realigned when said relative angular displacement is taken up.

8. A re-registering overtravel mechanism comprising a rotational input member and a rotational output member, a revolution counter connected between said input member and said output member, said revolution counter comprising a series of wheels adapted to be actuated progressively, said wheels each having a notch in its periphery, said notches being aligned when said output member is registered with said input member, said input member driving the first of said series of wheels, a latch mechanism attached to said output member engaging said notches when they are aligned, said input member driving said output member through said latch mechanism, said latch mechanism having means disengageable from said notches in response to an excessive load on said output member whereby said revolution counter counts the number of revolutions of said input member with respect to said output member, and said output member being re-registered with said input member when the overtravel of said input member with respect to said output member is taken up.

References Cited in the file of this patent
UNITED STATES PATENTS

| | | |
|---|---|---|
| 2,202,497 | Landahl | May 28, 1940 |
| 2,722,379 | Hayek | Nov. 1, 1955 |
| 2,746,318 | Benjamin | May 22, 1956 |